T. ZIMMERMAN.
COOLING FAN FOR ENGINES.
APPLICATION FILED NOV. 19, 1914.
1,259,191.
Patented Mar. 12, 1918.
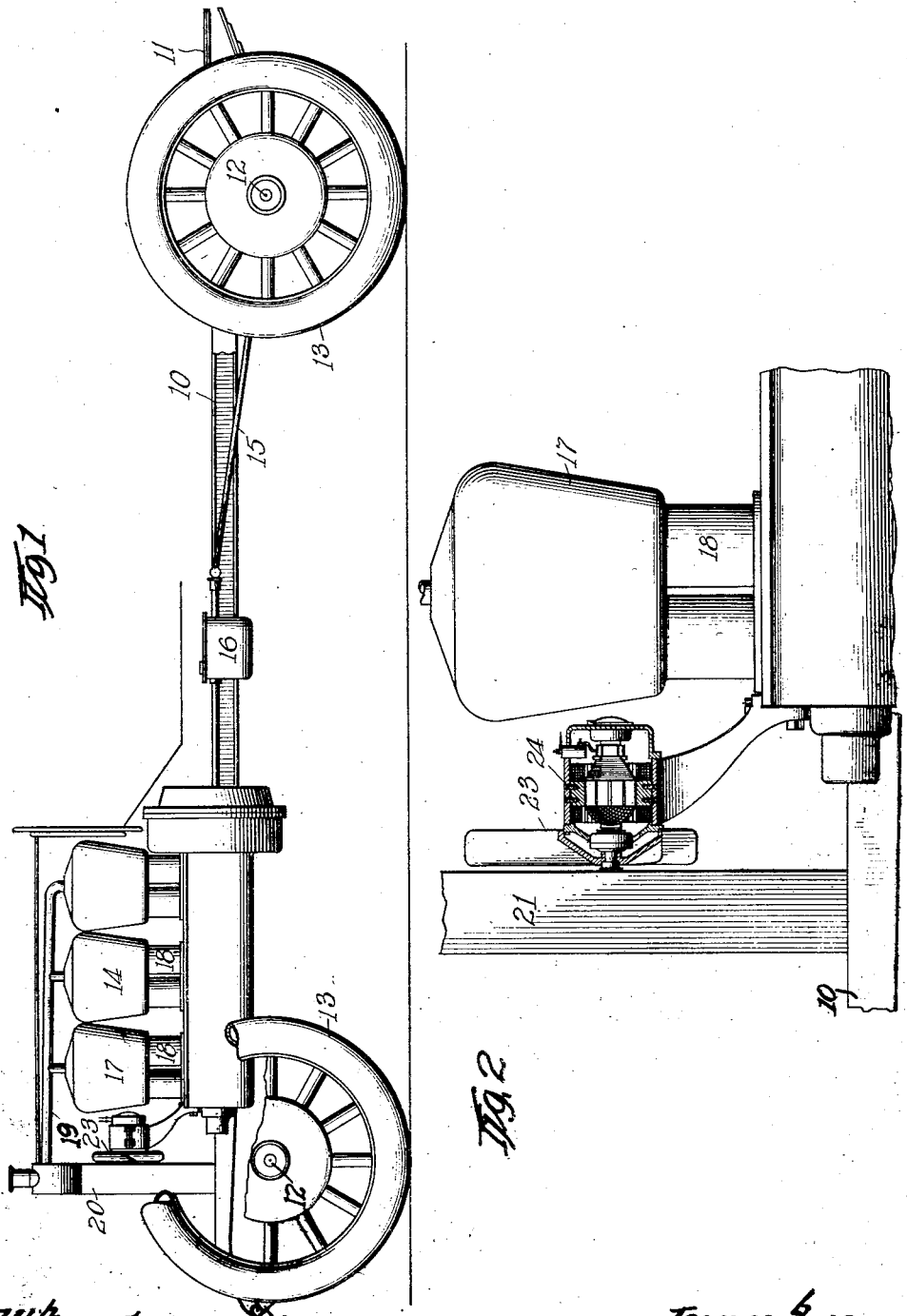

UNITED STATES PATENT OFFICE.

THOMAS ZIMMERMAN, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

COOLING-FAN FOR ENGINES.

1,259,191.   Specification of Letters Patent.   Patented Mar. 12, 1918.

Application filed November 19, 1914. Serial No. 873,003.

*To all whom it may concern:*

Be it known that I, THOMAS ZIMMERMAN, a citizen of the United States, residing at Niagara Falls, in the county of Niagara and State of New York, have invented new and useful Improvements in Cooling-Fans for Engines, of which the following is a full, clear, concise, and exact description, reference being had to the accompanying drawing, forming a part of this specification.

My invention relates to cooling fans for engines.

One type of engine cooling apparatus at present employed, includes a water jacket for each cylinder of the engine, and a radiator through which the water passes after leaving the water jackets. After the water in the jackets becomes heated, it flows into the radiator where it is cooled and is then returned through suitable pipes to the jackets. In certain forms of radiators, the water is cooled by air currents which are forced through the flues or tubes of the radiator, the amount of heat extracted from the water depending on the available cooling surface exposed and the quantity of air passed through the tubes. The air currents are usually created by a rotary fan driven from the engine through suitable mechanical connections.

In another type of engine cooling apparatus, the cylinders of the engine are provided with a plurality of lugs or flanges to increase the radiating surface of the cylinders, and a rotary fan is employed to direct a forced draft against the flanges and the cylinder walls. The fan is driven from the engine through suitable gearing.

It is often desirable to operate the cooling fan without regard to the speed of the engine, or to temporarily stop its operation. This is not practicable where the fan is driven through mechanical connections with the engine, as the speed of the fan will be wholly dependent upon the speed of the engine.

An object of the present invention is to provide a cooling fan for engines, which may be driven at any desired speed, irrespective of the speed of the engine.

Other objects of my invention will hereinafter appear.

One embodiment of my invention is illustrated in the accompanying drawings, in which—

Figure 1 is a side view of an automobile chassis, to which my invention has been applied.

Fig. 2 is a sectional view on an enlarged scale of a portion of the construction illustrated in Fig. 1.

In the drawings 10 designates the frame of an automobile mounted through the medium of springs 11 and an axle 12, carried by wheels 13 in the ordinary manner. Mounted on the frame 10 is a gas engine 14 adapted to drive the car through a shaft 15 and transmission gears 16. The engine is provided with a water cooling system, which includes a water jacket 17 for each of the cylinders 18, and pipes 19 leading from the water jackets to the radiator 20. The radiator is of the honeycomb type, comprising a flat tank 21, provided with a plurality of small tubes, like the flues of a boiler. In order to increase the efficiency of the radiator, an electrically operated cooling fan 23 is interposed between it and the engine. This fan is adapted to create a forced draft through the flue tubes of the radiator. It is driven independently of the engine by an electric motor 24, of any desired type, adapted to run at variable speeds to regulate the quantity of air passing through the flue tubes. This latter feature is particularly valuable as it enables the operator to control the cooling effect of the radiator with precision. Thus, in hot weather the cooling effect of the radiator may be increased as desired by accelerating the speed of the fan to cause a greater quantity of air to pass through the flue tubes, while in cold weather the cooling effect may be reduced to a minimum by stopping the fan, thereby completely shutting off the forced draft.

By this invention the noise incident to the operation of the engine cooling fan is reduced to a minimum, as all gears, belts, chains, or other mechanical driving connections between the engine and the fan are dispensed with.

It is to be understood that the invention may be applied to any type of cooling equipment wherein a cooling fan is employed.

The embodiment of my invention described herein has been selected merely for the purpose of illustration. My invention covers all equivalent means for accomplishing the desired result, so long as such means fall within the scope of the appended claims.

What I claim as new and desire to secure by Letters Patent of the United States is:

1. In combination, an engine, a cooling fan therefor, and means independent of said engine for driving said fan under operating conditions.

2. In a cooling system for automobile engines, a cooling fan and means for driving said fan, said means being controllable independently of the speed and duration of operation of any part of the automobile or its engine.

3. In a cooling system for automobile engines, in combination with an automobile and its engine, a cooling fan and an independent electric motor for driving said fan, said motor being controllable to control the speed of said fan.

In witness whereof, I have hereunto subscribed my name in the presence of two witnesses.

THOS. ZIMMERMAN.

Witnesses:
T. R. Du Bois,
Marie Coulson.